(12) United States Patent
Yonaha et al.

(10) Patent No.: US 10,951,821 B2
(45) Date of Patent: Mar. 16, 2021

(54) IMAGING CONTROL DEVICE, IMAGING SYSTEM, AND IMAGING CONTROL METHOD

(71) Applicant: FUJIFILM Corporation, Tokyo (JP)

(72) Inventors: Makoto Yonaha, Tokyo (JP); Masashi Kuranoshita, Yokohama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/550,530

(22) Filed: Aug. 26, 2019

(65) Prior Publication Data

US 2019/0379829 A1    Dec. 12, 2019

Related U.S. Application Data

(63) Continuation of application No. PCT/JP2018/006773, filed on Feb. 23, 2018.

(30) Foreign Application Priority Data

Mar. 16, 2017   (JP) ................................ 2017-051521

(51) Int. Cl.
   *H04N 5/232*       (2006.01)
(52) U.S. Cl.
   CPC ..... *H04N 5/23238* (2013.01); *H04N 5/23299* (2018.08)
(58) Field of Classification Search
   CPC ........................ H04N 5/23238; H04N 5/23299
   (Continued)

(56) References Cited

U.S. PATENT DOCUMENTS

| 10,198,003 B2 | 2/2019 | Sabe et al. |
| 2004/0169870 A1* | 9/2004 | Ahmed ............. H04N 1/19515 |
| | | 358/1.8 |

(Continued)

FOREIGN PATENT DOCUMENTS

| JP | 2001-189888 A | 7/2001 |
| JP | 2010-114599 A | 5/2010 |
| JP | 2016-082441 A | 5/2016 |

OTHER PUBLICATIONS

International Search Report issued in PCT/JP2018/006773 dated May 15, 2018.

(Continued)

*Primary Examiner* — Joseph G Ustaris
*Assistant Examiner* — Matthew David Kim
(74) *Attorney, Agent, or Firm* — Studebaker & Brackett PC

(57) ABSTRACT

An imaging control device includes a wide-angle image acquisition unit 401, an imaging information acquisition unit 405, a margin information acquisition unit 407, a region information acquisition unit 409, an imaging region calculation unit 413 that calculates an imaging region of each of divided images constituting a composite image as each imaging region in a wide-angle image, in which a margin is secured, based on imaging information, margin information, and imaging target region information, and a control unit 411 that moves a moving object, makes the moving object image each calculated imaging region in a closed-up imaging mode with a camera, and acquires captured closed-up images as the divided images. The control unit 411 compares an image corresponding to each imaging region of the acquired wide-angle image with an image acquired in the closed-up imaging mode with the camera and controls a (Continued)

position of the moving object where the camera is made to image each imaging region in the closed-up imaging mode.

11 Claims, 14 Drawing Sheets

(58) Field of Classification Search
USPC .......................................................... 348/36
See application file for complete search history.

(56) References Cited

U.S. PATENT DOCUMENTS

| | | | |
|---|---|---|---|
| 2012/0050525 A1 | 3/2012 | Rinner et al. | |
| 2017/0048494 A1* | 2/2017 | Boyle | H04N 5/2256 |
| 2017/0221241 A1* | 8/2017 | Hannah | B64C 39/024 |
| 2018/0273173 A1* | 9/2018 | Moura | G01N 25/72 |

OTHER PUBLICATIONS

International Preliminary Report on Patentability and Written Opinion issued in PCT/JP2018/006773; dated Sep. 17, 2019.

* cited by examiner

B

A

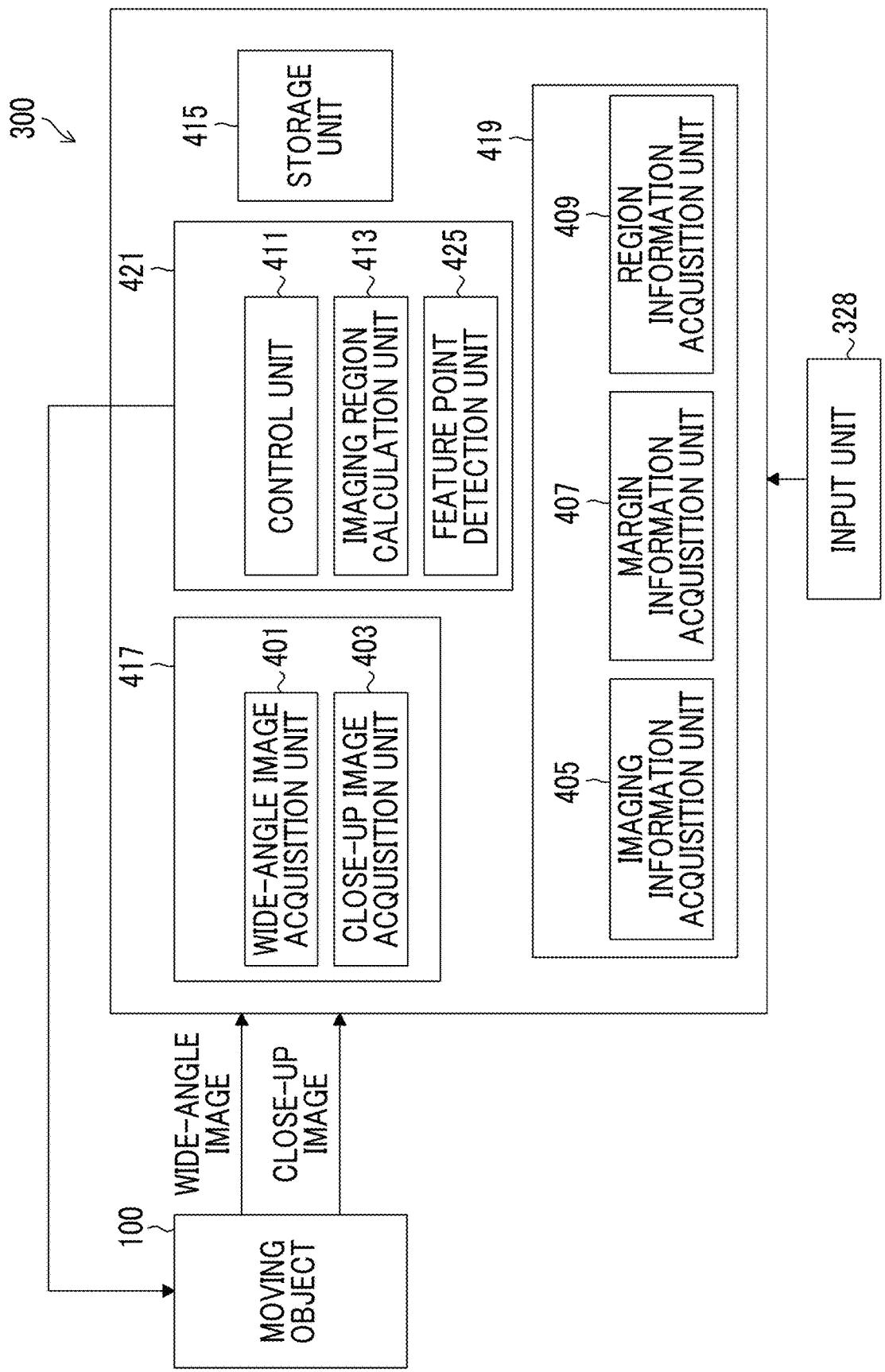

IMAGING CONTROL DEVICE, IMAGING SYSTEM, AND IMAGING CONTROL METHOD

CROSS-REFERENCE TO RELATED APPLICATIONS

The present application is a Continuation of PCT International Application No. PCT/JP2018/006773 filed on Feb. 23, 2018 claiming priority under 35 U.S.C § 119(a) to Japanese Patent Application No. 2017-051521 filed on Mar. 16, 2017. Each of the above applications is hereby expressly incorporated by reference, in its entirety, into the present application.

BACKGROUND OF THE INVENTION

1. Field of the Invention

The present invention relates to an imaging control device, an imaging system, and an imaging control method, and in particular, to an imaging control device, an imaging system, and an imaging control method in a case where an imaging target is divided into a plurality of parts to acquire divided images.

2. Description of the Related Art

In the related art, a technique that makes a moving object to capture a captured image desired by a user by controlling movement and imaging of the moving object comprising a camera has been suggested.

For example, JP2001-189888A describes an imaging instruction apparatus that transmits an imaging instruction to a flying object mounted with an imaging apparatus. The imaging instruction apparatus described in JP2001-189888A is a technique that provides a user with a plurality of imaging patterns to make the user select one of the plurality of imaging, displays a map and receives a position designated on the map as an imaging position, and promptly performs the imaging instruction to the flying object mounted with the imaging apparatus through an easy operation.

SUMMARY OF THE INVENTION

Here, in a case where a captured image is used for detection and inspection of damage (for example, crack), the image quality of the captured image is required to be excellent. That is, a high-definition captured image is used for inspection, whereby inspection with high quality is implemented. For example, in a case where detection and inspection of damage of a concrete surface are performed, there is a need to detect a damage part, such as a crack, with the captured image, and in a case where the quality of the captured image is not excellent, accurate detection may not be performed.

As a method of the methods of acquiring a captured image capable of detecting damage of the concrete surface with high accuracy, there is a method of performing imaging close to an imaging target (inspection target) and acquiring a captured image. In a case where a moving object comprising a camera is made to acquire a captured image, the moving object is brought close to an imaging target to perform imaging, and a captured image with excellent quality is acquired. Even in a method of imaging the imaging target in a zoom imaging mode and acquiring a captured image, it is possible to obtain a captured image with the same excellent quality as close-up imaging.

In a case where a captured image is acquired through close-up imaging, an imaging target may not fit in one captured image. For example, in a case where damage detection and inspection of the concrete surface are performed, a captured image capable of detecting damage of a deck slab with high accuracy can be acquired through close-up imaging; however, a whole image of a panel as an inspection unit does not fit in one image. In such a case, a plurality of captured images by close-up imaging are acquired, and a plurality of captured images are composed, thereby generating a composite image in which the whole image of the inspection target fits.

In a case where divided images (images obtained by dividing and imaging an imaging target) are composed to acquire a composite image, a margin as a region where the captured images overlap is needed. Accordingly, in a case where the divided images are acquired, there is a need to perform imaging in consideration of the margin. That is, in a case where an imaging region of the divided images is not decided in consideration of the margin in a case where the divided images are acquired, the composite image may not be generated due to omission of imaging.

In JP2001-189888A, there is no description of acquisition of the composite image in consideration of the margin in a case where the divided images constituting the composite image are acquired.

The invention has been accomplished in consideration of such a situation, and an object of the invention is to provide an imaging control device, an imaging system, and an imaging control method capable of allowing efficient and accurate acquisition of divided images, in which a margin is secured.

An aspect of the invention for achieving the above-described object provides an imaging control device that controls imaging of a moving object comprising a camera. The imaging control device comprises a wide-angle image acquisition unit that acquires a wide-angle image acquired by capturing a whole image of an imaging target in a wide-angle imaging mode, an imaging information acquisition unit that acquires imaging information relating to the number of images or an imaging angle of view of a plurality of divided images acquired by capturing a part of the whole image of the imaging target in a close-up imaging mode with the camera of the moving object, a margin information acquisition unit that acquires margin information relating to a margin in a case where the plurality of divided images are composed to generate a composite image of the imaging target, a region information acquisition unit that acquires imaging target region information relating to a region of the whole image of the imaging target, an imaging region calculation unit that calculates an imaging region of each of the divided images constituting the composite image as each imaging region in the wide-angle image, in which the margin is secured, based on the imaging information, the margin information, and the imaging target region information, and a control unit that moves the moving object, makes the moving object image each calculated imaging region in a close-up imaging mode with the camera, and acquires captured close-up images as the divided images. The control unit compares an image corresponding to each imaging region of the acquired wide-angle image with an image captured in the close-up imaging mode with the camera and controls a position of the moving object where the camera is made to image each imaging region in the close-up imaging mode.

According to the aspect, the imaging regions of the divided images, in which the margin is secured, in the wide-angle image are calculated based on the acquired imaging information, margin information, and imaging target region information, and the moving object is made to capture the divided images based on the calculated imaging regions. With this, in the aspect, it is possible to make the moving object efficiently and accurately capture the divided images, in which the margin is secured.

Preferably, the imaging region calculation unit calculates the imaging region where the composite image is constituted of a minimum number of the divided images.

According to the aspect, since the imaging region where the composite image is constituted of a minimum number of a plurality of divided images is calculated by the imaging region calculation unit, it is possible to make the moving object perform efficient acquisition of the divided images.

Preferably, the margin information acquisition unit acquires a margin ratio indicating a degree of overlap of adjacent divided images as the margin information.

According to the aspect, since the margin ratio indicating the degree of overlap of adjacent divided images as the margin information is acquired by the margin information acquisition unit, it is possible to make the moving object acquire the divided images, in which the margin is appropriately secured.

Preferably, the imaging control device further comprises a resolution acquisition unit that acquires resolution of the divided images, and the margin information acquisition unit adjusts the margin information according to the resolution.

According to the aspect, the resolution of the divided images is acquired by the resolution acquisition unit, and the margin information is adjusted by the margin information acquisition unit according to the resolution. With this, in the aspect, it is possible to acquire the divided images having the margin according to the resolution of the divided images, and to make the moving object perform efficient acquisition of the divided images.

Preferably, the imaging control device further comprises a feature point detection unit that detects feature points of the plurality of divided images in a case of the composition, and the margin information acquisition unit adjusts the margin information according to the number of feature points.

According to the aspect, the feature points of a plurality of divided images in a case of the composition are detected by the feature point detection unit, and the margin information is adjusted by the margin information acquisition unit according to the number of feature points. With this, in the aspect, it is possible to acquire the divided images having the margin according to the feature points of the divided images, and to make the moving object perform efficient acquisition of the divided images.

Preferably, the control unit makes the moving object acquire the close-up images captured in the close-up imaging mode as the divided images by detecting correspondence points between the close-up images and images corresponding to the imaging regions.

According to the aspect, the correspondence points between the close-up images and the images corresponding to the imaging regions are detected by the control unit, and the moving object is made to acquire the close-up images captured in the close-up imaging mode as the divided images. With this, in the aspect, it is possible to allow the control unit to accurately move the moving object to a position where the imaging region can be imaged, and to make the moving object acquire accurate divided images.

Preferably, the control unit estimates the position of the moving object by detecting correspondence points between the image corresponding to each imaging region of the wide-angle image and the image captured in the close-up imaging mode with the camera.

According to the aspect, the correspondence points between the image corresponding to each imaging region of the wide-angle image and the image captured in the close-up imaging mode with the camera are detected by the control unit, and the position of the moving object is estimated by the control unit. With this, in the aspect, it is possible to accurately estimate the position of the moving object, and to make the moving object efficiently perform acquisition of the divided images.

Preferably, the imaging control device further comprises a storage unit that stores the divided images, and the control unit makes the storage unit store the divided images.

According to the aspect, the storage unit that stores the divided images is provided, and the divided images are stored in the storage unit by the control unit. With this, in the aspect, it is possible to store the divided images, and to provide the divided images as required.

Preferably, the region information acquisition unit acquires drawing information of the imaging target as the imaging target region information.

According to the aspect, the drawing information of the imaging target is acquired as the imaging target region information by the region information acquisition unit, in a case where there is an existing drawing for the imaging target, it is possible to effectively use the drawing.

Another aspect of the invention provides an imaging system comprising the above-described imaging control device and the moving object.

Still another aspect of the invention provides an imaging control method that controls imaging of a moving object comprising a camera. The imaging control method comprises a wide-angle image acquisition step of acquiring a wide-angle image acquired by capturing a whole image of an imaging target in a wide-angle imaging mode, an imaging information acquisition step of acquiring imaging information relating to the number of images or an imaging angle of view of a plurality of divided images acquired by imaging a part of the whole image of the imaging target in a close-up imaging mode with the camera of the moving object, a margin information acquisition step of acquiring margin information relating to a margin in a case where the plurality of divided images are composed to generate a composite image of the imaging target, a region information acquisition step of acquiring imaging target region information relating to a region of the whole image of the imaging target, an imaging region calculation step of calculating an imaging region of each of the divided images constituting the composite image as each imaging region in the wide-angle image, in which the margin is secured, based on the imaging information, the margin information, and the imaging target region information, and a control step of moving the moving object, making the moving object image each calculated imaging region in a close-up imaging mode with the camera, and acquiring captured close-up images as the divided images. In the control step, an image corresponding to each imaging region of the acquired wide-angle image is compared with an image captured in the close-up imaging mode with the camera and a position of the moving object where the camera is made to image each imaging region in the close-up imaging mode is controlled.

According to the invention, the imaging regions of the divided images, in which the margin is secured, in the wide-angle image are calculated based on the acquired imaging information, margin information, and imaging target region information, and the moving object is made to capture the divided images based on the calculated imaging regions. For this reason, it is possible to make the moving object efficiently and accurately capture the divided images, in which the margin is secured.

BRIEF DESCRIPTION OF THE DRAWINGS

FIG. 17 is a diagram showing a functional configuration example of the imaging control device.

DESCRIPTION OF THE PREFERRED EMBODIMENTS

Hereinafter, a preferred embodiment of an imaging control device, an imaging system, and an imaging control method according to the invention will be described referring to the accompanying drawings.

An imaging target of the invention will be described. The imaging target of the invention is not particularly limited. For example, in a case where detection and inspection of damage of a structure or a building are performed using a captured image, a target to be imaged is taken. That is, the imaging target becomes an inspection target of inspection that is performed using a captured image. In the following description, a case where a composite image in a unit of panel (a deck slab 6 of a panel) is acquired through inspection in a unit of panel in a case where inspection of a bridge 1 (FIG. 1) as a specific example is performed will be described.

Figure 1:
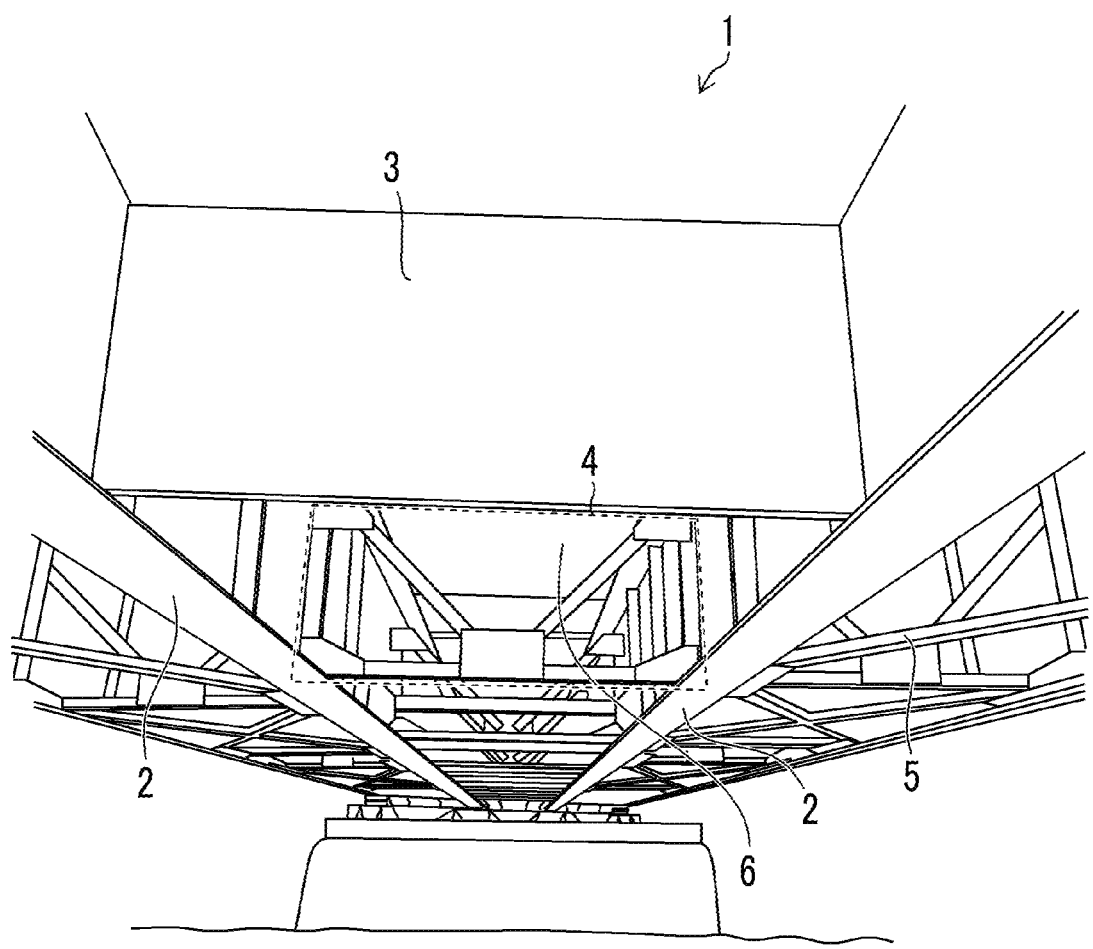
FIG. 1 is a perspective view showing a structure of a bridge.

FIG. 1 is a perspective view showing a structure of a bridge that is one of structures as an imaging target (inspection target), and is a perspective view when the bridge is viewed from below.

The bridge 1 shown in FIG. 1 has main girders 2, cross beams 3, cross frames 4, and lateral frames 5, and the main girders 2, the cross beams 3, the cross frames 4, and the lateral frames 5 are connected by bolts, rivets, or welding. Deck slabs 6 on which vehicles and the like travel are placed on the main girders 2 or the like. The deck slabs 6 are generally made of reinforced concrete.

The main girder 2 is a member that is laid between the abutments or the bridge piers and supports the load of the vehicles and the like on the deck slab 6. The cross beam 3 is a member that connects the main girders 2 to support the load by a plurality of main girders 2. The cross frame 4 and the lateral frame 5 are members that connect the main girders 2 to resist a lateral load of wind and earthquake, respectively.

In a case where inspection of the bridge 1 is performed, for example, a captured image is acquired for each panel, and inspection is performed regarding whether or not there is a damaged part, such as a crack. A panel is a space that is formed by dividing the deck slab 6 by two facing main girders 2 and two facing cross beams 3 or cross frames 4.

Figure 2:
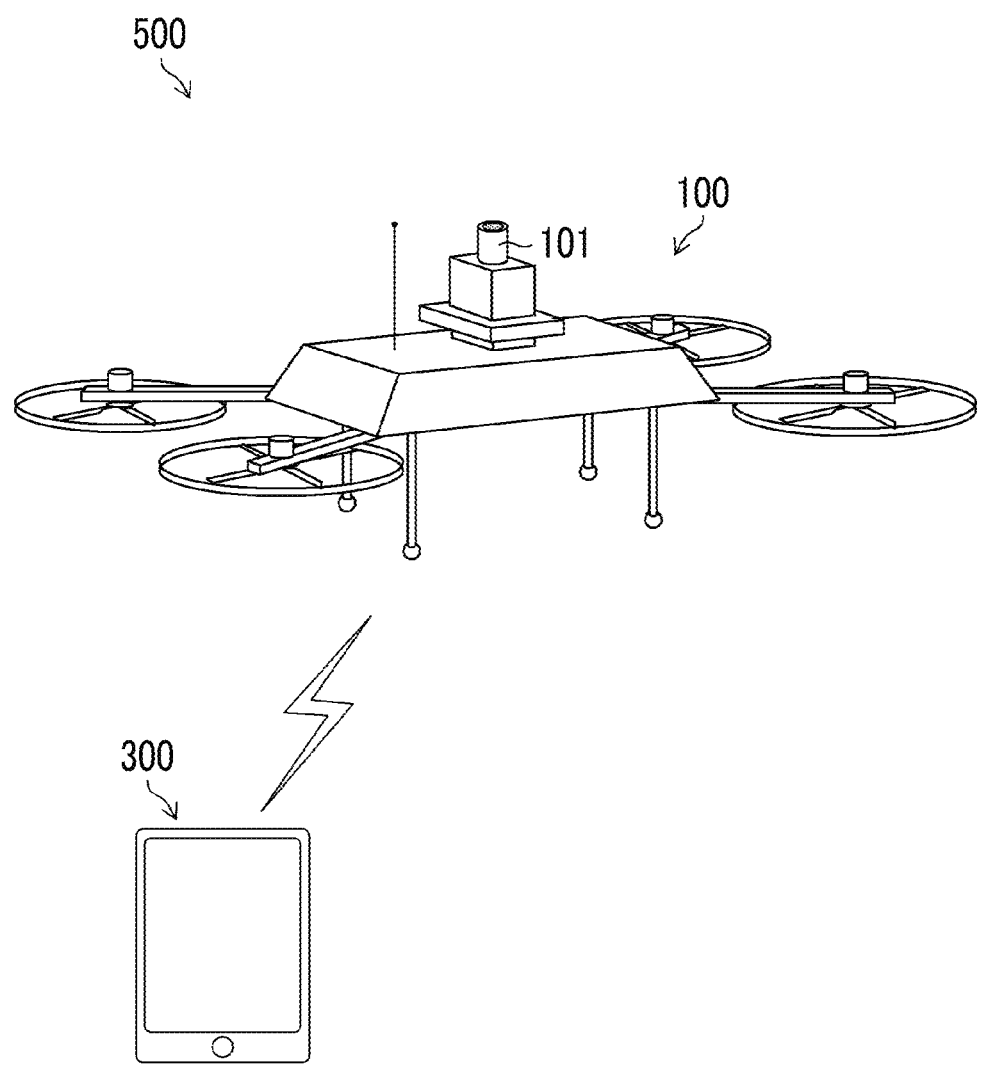
FIG. 2 is a conceptual diagram showing an imaging system.

FIG. 2 is a conceptual diagram showing an imaging system of the invention.

An imaging system 500 is configured of moving object 100 and a computer 300.

The moving object 100 comprises a camera 101, and performs movement and imaging with the camera 101 under the control of the computer 300. The moving object 100 is not particularly limited as long as the moving object 100 performs movement and imaging under the control of the computer 300. For example, as the moving object 100, a traveling robot, a small helicopter, a multicopter, a drone, or an apparatus called an unmanned aerial vehicle (UAV) is exemplified.

The computer 300 and the moving object 100 are communicable with each other, and the computer 300 can perform control of the movement of the moving object 100 and imaging control in the camera 101 with remote control.

Figure 3:
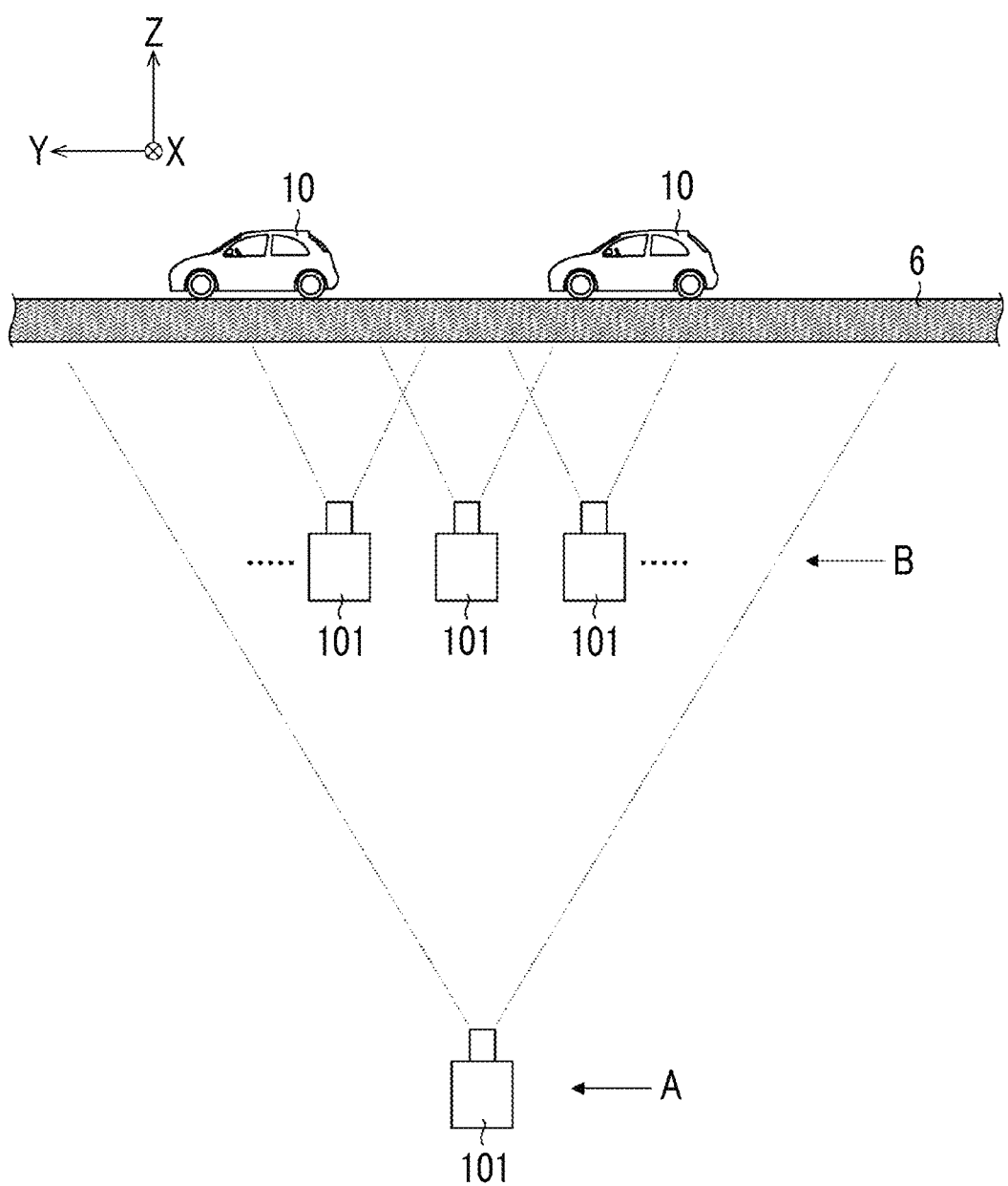
FIG. 3 is a diagram conceptually showing an imaging position of a moving object.

FIG. 3 is a diagram conceptually showing an imaging position of the moving object 100. FIG. 3 is a conceptual diagram when the deck slab 6 is viewed from an X-axis direction in FIG. 2. The moving object 100 comprises the camera 101 as shown in FIG. 2, and the camera 101 is moved with the movement of the moving object 100. In FIG. 3, the moving object 100 is omitted. A vehicle 10 travels on the deck slab 6, and a captured image from below the deck slab 6 is acquired to perform detection and inspection of damage of the deck slab 6.

The moving object 100 is moved to each imaging position under the control of the computer 300, and then, performs wide-angle imaging and close-up imaging to acquire each image. In a case where inspection is performed in a unit of panel of the deck slab 6, an image in which the whole image of the panel fits is acquired through wide-angle imaging, and an image in which a portion of the panel is reflected is acquired through close-up imaging.

A position A shown in FIG. 3 is a position where a wide-angle image acquired by capturing a whole image of the imaging target in a wide-angle imaging mode with the camera 101 is acquired. The moving object 100 acquires the wide-angle image at the position A away from the deck slab 6 according to a movement command of the computer 300. A subject distance from the deck slab 6 at the position A is such a distance that one panel fits in one captured image.

A position B shown in FIG. 3 is a position where a close-up image acquired by capturing a part of the whole image of the imaging target in a close-up imaging mode with the camera 101 of the moving object 100 is acquired with the camera 101. The moving object 100 moves to the position B close to the deck slab 6 according to a movement command of the computer 300 and acquires the close-up image. The moving object 100 defines the acquired close-up image as a divided image and acquires a plurality of close-up images such that a composite image constituted of the divided images, in which the whole image of the panel fits, can be generated. The acquisition of the close-up images (divided images) is performed based on the movement command and an imaging command output from the computer 300 that calculates the imaging region, whereby it is possible to perform efficient and accurate acquisition of the close-up images. Here, the divided images are images that constitute the composite image, and refer to images that are used for composition among the close-up images. The close-up images are images that are captured in the close-up imaging mode with the moving object 100, and a part or all of the close-up images become the divided images.

Next, the computer 300 comprising the imaging control device of the invention will be described.

Figure 4:
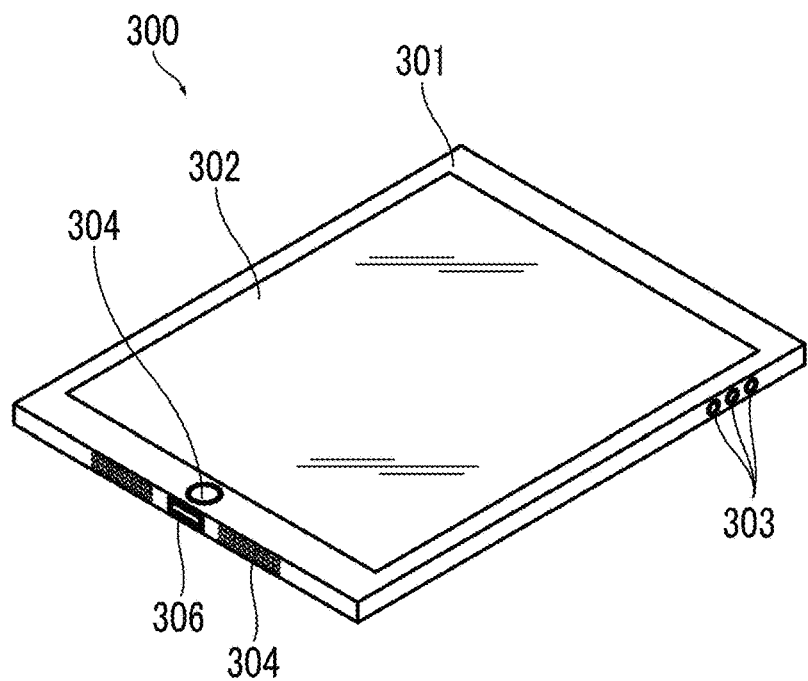
FIG. 4 is a perspective view showing the appearance configuration of a computer.
Figure 5:
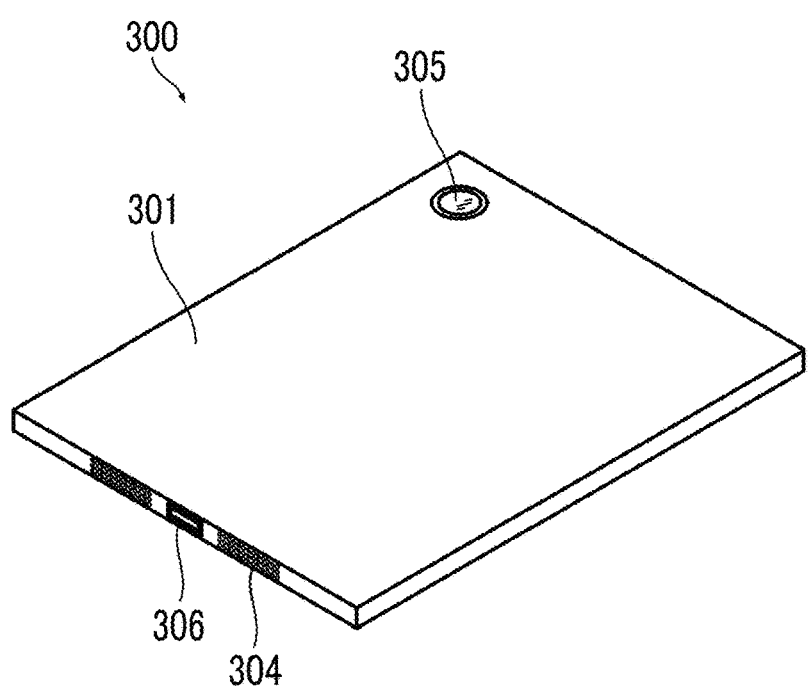
FIG. 5 is a perspective view showing the appearance configuration of the computer.

FIGS. 4 and 5 are perspective views showing the appearance configuration of the computer 300. FIG. 4 is a front perspective view, and FIG. 5 is a rear perspective view.

As shown in FIGS. 4 and 5, the computer 300 is configured of a tablet computer. The computer 300 comprises a flat plate-shaped housing 301 having a rectangular contour, and comprises, in the housing 301, a touch panel display 302 that serves as a display unit 326 (FIG. 6) and an input unit 328 (FIG. 6), operation buttons 303, a speaker 304, an internal camera 305, an external connection terminal 306, and the like.

Figure 6:
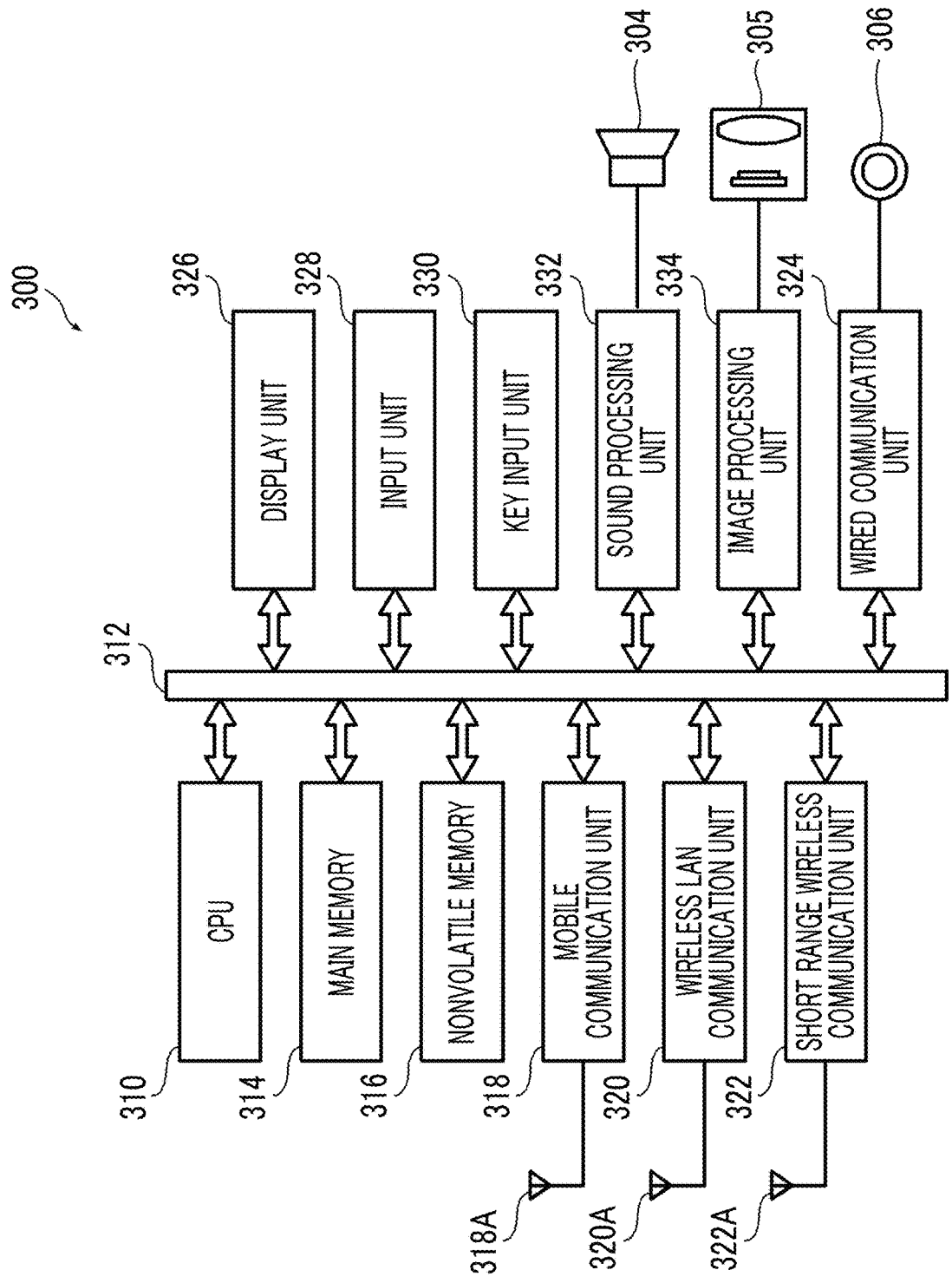
FIG. 6 is a block diagram showing the system configuration of the computer.

FIG. 6 is a block diagram showing the system configuration of the computer 300.

As shown in FIG. 6, the computer 300 comprises a central processing unit (CPU) 310 that controls the overall operation of the computer 300, and is configured such that a main memory 314, a nonvolatile memory 316, a mobile communication unit 318, a wireless LAN communication unit 320, a short range wireless communication unit 322, a wired communication unit 324, a display unit 326, an input unit 328, a key input unit 330, a sound processing unit 332, an image processing unit 334, and the like are connected to the CPU 310 through a system bus 312.

The CPU 310 functions as a control unit that controls the operation of the whole computer by reading an operation program (an operating system (OS) and an application program operating on the OS), fixed form data, and the like stored in the nonvolatile memory 316, developing the operation program in the main memory 314, and executing the operation program.

The main memory 314 is configured of, for example, a random access memory (RAM) and functions as a work memory of the CPU 310.

The nonvolatile memory 316 is configured of, for example, a flash electrically erasable programmable read only memory (EEPROM) and stores the above-described operation program or various kinds of fixed form data. The nonvolatile memory 316 functions as a storage unit of the computer 300 and stores various kinds of data.

The mobile communication unit 318 executes transmission and reception of data to and from a nearby base station (not shown) through an antenna 318A based on a third generation mobile communication system conforming to the IMT-2000 standard (International Mobile Telecommunication-2000) and a fourth generation mobile communication system conforming to the IMT-Advance standard (International Mobile Telecommunications-Advanced).

The wireless LAN communication unit 320 performs wireless LAN communication according to a predetermined wireless LAN communication standard (for example, the IEEE802.11a/b/g/n standard) with a wireless LAN access point or an external apparatus capable of wireless LAN communication, through an antenna 320A.

The short range wireless communication unit 322 executes transmission and reception of data to and from, for example, another apparatus based on the Bluetooth (Registered Trademark) standard within a range of Class 2 (within a radius of about 10 m) through an antenna 322A.

The wired communication unit 324 performs communication according to a predetermined communication standard with an external apparatus connected by a cable through an external connection terminal 306. For example, the wired communication unit 324 performs USB communication.

The display unit 326 is configured of a color liquid crystal display (LCD) panel that configures a display part of the touch panel display 302 and a drive circuit of the color liquid crystal display, and displays various images.

The input unit 328 configures a touch panel part of the touch panel display 302. The input unit 328 is integrated with the color LCD panel using transparent electrodes.

The key input unit 330 is configured of a plurality of operation buttons 303 in the housing 301 of the computer 300 and drive circuits of the operation buttons 303.

The sound processing unit 332 analogizes digital sound data given through the system bus 312 and outputs analog sound data from the speaker 304.

The image processing unit 334 digitizes an analog image signal output from the internal camera 305 comprising an imaging lens and an image sensor, executes required signal processing on the image signal, and outputs the image signal.

Figure 7:
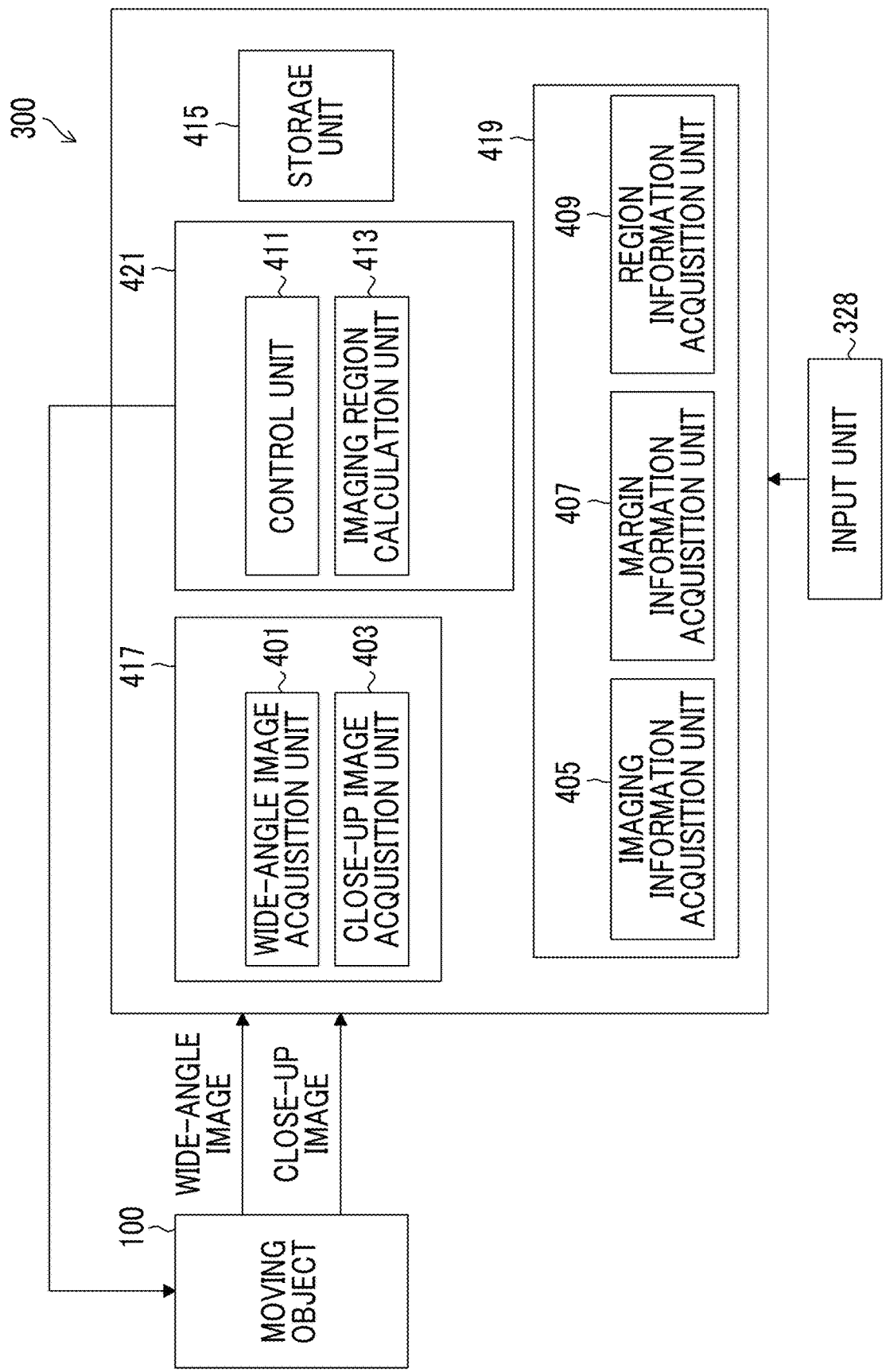
FIG. 7 is a diagram illustrating a functional configuration example of an imaging control device.

Next, the imaging control device in the computer 300 will be described,

FIG. 7 is a diagram illustrating a functional configuration example of the imaging control device in the computer 300.

The functions of the imaging control device are implemented by, for example, the CPU 310 of the computer 300. The functions of the imaging control device are primarily configured of an image acquisition unit 417, a parameter acquisition unit 419, a controller 421, and a storage unit 415.

The image acquisition unit 417 is configured of a wide-angle image acquisition unit 401 and a close-up image acquisition unit 403. The image acquisition unit 417 is implemented by the mobile communication unit 318, the wireless LAN communication unit 320, or the short range wireless communication unit 322 of the computer 300.

The wide-angle image acquisition unit 401 acquires a wide-angle image acquired by capturing the whole image of the imaging target with a long subject distance in a wide-angle imaging mode. As a specific example, the wide-angle image acquisition unit 401 acquires an image, in which the whole image of one panel fits within the angle of view of the camera 101, as a wide-angle image.

The close-up image acquisition unit 403 acquires a close-up image acquired by capturing a part of the whole image of the imaging target with a short subject distance in a close-up imaging mode. As a specific example, the close-up image acquisition unit 403 acquires an image acquired by imaging the deck slab 6 of a portion of one panel in the close-up imaging anode as a close-up image.

The image acquisition unit 417 can acquire a still image and a motion image. A motion image also includes a live view image.

Next, the parameter acquisition unit 419 will be described.

The parameter acquisition unit 419 is configured of an imaging information acquisition unit 405, a margin information acquisition unit 407, and a region information acquisition unit 409. The parameter acquisition unit 419 is implemented by, for example, the CPU 310 of the computer 300.

The imaging information acquisition unit 405 acquires information relating to imaging of a divided image. That is, the imaging information acquisition unit 405 acquires imaging information relating to the number of images or an imaging angle of view of a plurality of divided images acquired by capturing a part of the whole image of the imaging target in the close-up imaging mode with the camera 101 of the moving object 100. For example, the imaging information acquisition unit 405 acquires information regarding the number of divided parts of one panel (imaging target) for imaging or information regarding the magnitude of the angle of view in a case where the camera 101 performs close-up imaging.

The margin information acquisition unit 407 acquires margin information relating to a margin in a case where a plurality of divided images are composed to generate a composite image of the imaging target. For example, the margin information acquisition unit 407 acquires a margin ratio indicating a degree of overlap of adjacent divided images as the margin information. That is, the margin information acquisition unit 407 may acquire a ratio of an area overlapping an adjacent image to a whole area of a divided image as the margin ratio.

Figure 8:
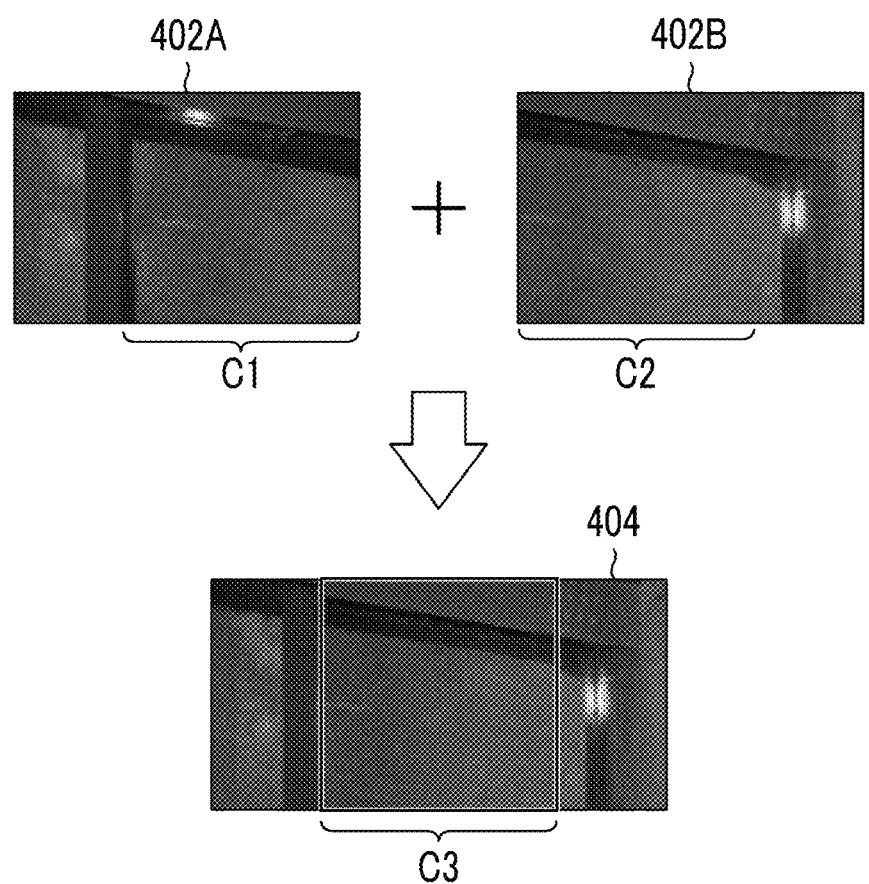
FIG. 8 is a diagram illustrating a margin.

Here, the margin will be described. FIG. 8 is a diagram illustrating a margin in a case where divided images are composed to generate a composite image.

In the case shown in FIG. 8, a case where a divided image 402A and a divided image 402B are composed to generate a composite image 404 is shown. In a case where the number of divided images is three or more, the composition shown in FIG. 8 is repeatedly performed. Here, the composition also includes a case where images are composed in a pan direction or a tilt direction of the camera and a case where images are composed in the pan direction and the tilt direction of the camera.

In a case where the divided image 402A and the divided image 402B are composed, the divided image 402A and the divided image 402B are composed in a given overlap region. The overlap area is referred to as a margin, and the size of the margin changes under various conditions. For example, in order to generate a composite image with given image quality, the margin changes depending on the image quality of the divided images and the number of correspondence points between the divided images. In a case where the divided images are acquired, the divided images are needed to be acquired by estimating an amount for the margin, and in a case where the divided images are acquired without estimating the margin, this causes imaging omission.

The divided image 402A has a margin C1, and the divided image 402B has a margin C2. The composition is performed such that the margins C1 and C2 overlap a margin C3, and the composite image 404 is composed.

The region information acquisition unit 409 acquires imaging target region information relating to a region of the whole image of the imaging target. That is, the region information acquisition unit 409 acquires information indicating a region of the imaging target in the wide-angle image as the imaging target region information. Specifically, in a case where the imaging target is the deck slab 6 of the panel, the region information acquisition unit 409 acquires information indicating a region of the panel in the wide-angle image. As a specific example of the imaging target region information acquired by the region information acquisition unit 409, drawing information (CAD information) of the imaging target is exemplified.

Next, the controller 421 will be described. The controller 421 is configured of a control unit 411 and an imaging region calculation unit 413. The controller 421 is implemented by, for example, the CPU 310 of the computer 300.

The imaging region calculation unit 413 calculates an imaging region of each of the divided images constituting the image of the whole image to be each imaging region in the wide-angle image, in which a margin is secured, based on the imaging information, the margin information, and the imaging target region information. That is, the imaging region calculation unit 413 calculates an imaging region corresponding to a divided image to be acquired, and the moving object 100 acquires the divided image based on the imaging region. For example, the imaging region calculation unit 413 calculates an imaging region where the image of the whole image is constituted of a minimum number of divided images.

The control unit 411 moves the moving object 100 and makes the moving object 100 image each calculated imaging region in the close-up imaging mode with the camera 101, thereby acquiring the captured close-up image as a divided image. For example, the control unit 411 detects correspondence points between the close-up image and an image corresponding to the imaging region, and makes the moving object 100 acquire the close-up image captured in the close-up imaging mode as the divided image. That is, the control unit 411 extracts a feature point of the close-up image, extracts a feature point of an image corresponding to an imaging region of the wide-angle image, and compares the feature points of the images to perform correspondence point detection. In comparison of the correspondence points, a known method is used. For example, as a method of comparison of the correspondence points, as a robust local feature quantity resistant to magnification or reduction, rotation, change in illumination, and the like between images, a scale-invariant feature transform (SIFT) feature quantity, a speed-upped robust feature (SURF) feature quantity, and an accelerated KAZE (AKAZE) feature quantity are known.

The control unit 411 compares an image corresponding to each imaging region of the acquired wide-angle image with an image captured in the close-up imaging mode with the camera 101, and controls the position of the moving object 100 where the camera 101 is made to image each imaging region in the close-up imaging mode. Specifically, the control unit 411 estimates the position of the moving object 100 by detecting the correspondence points between the image corresponding to each imaging region of the wide-angle image and the image captured in the close-up imaging anode with the camera 101. In comparison of the correspondence points, a known method is used. For example, the above-described method is used as the method of comparison of the correspondence points.

The storage unit 415 stores images, and specifically, stores the wide-angle image and the close-up images. The storage unit 415 also stores the divided images among the close-up images and the composite image generated by composing the divided images. The control unit 411 makes the storage unit 415 store the images. The storage unit is implemented by, for example, the main memory 314 of the computer 300.

Next, an operation of the imaging system 500 configured of the imaging control device in the computer 300 and the moving object 100 will be described.

Figure 9:
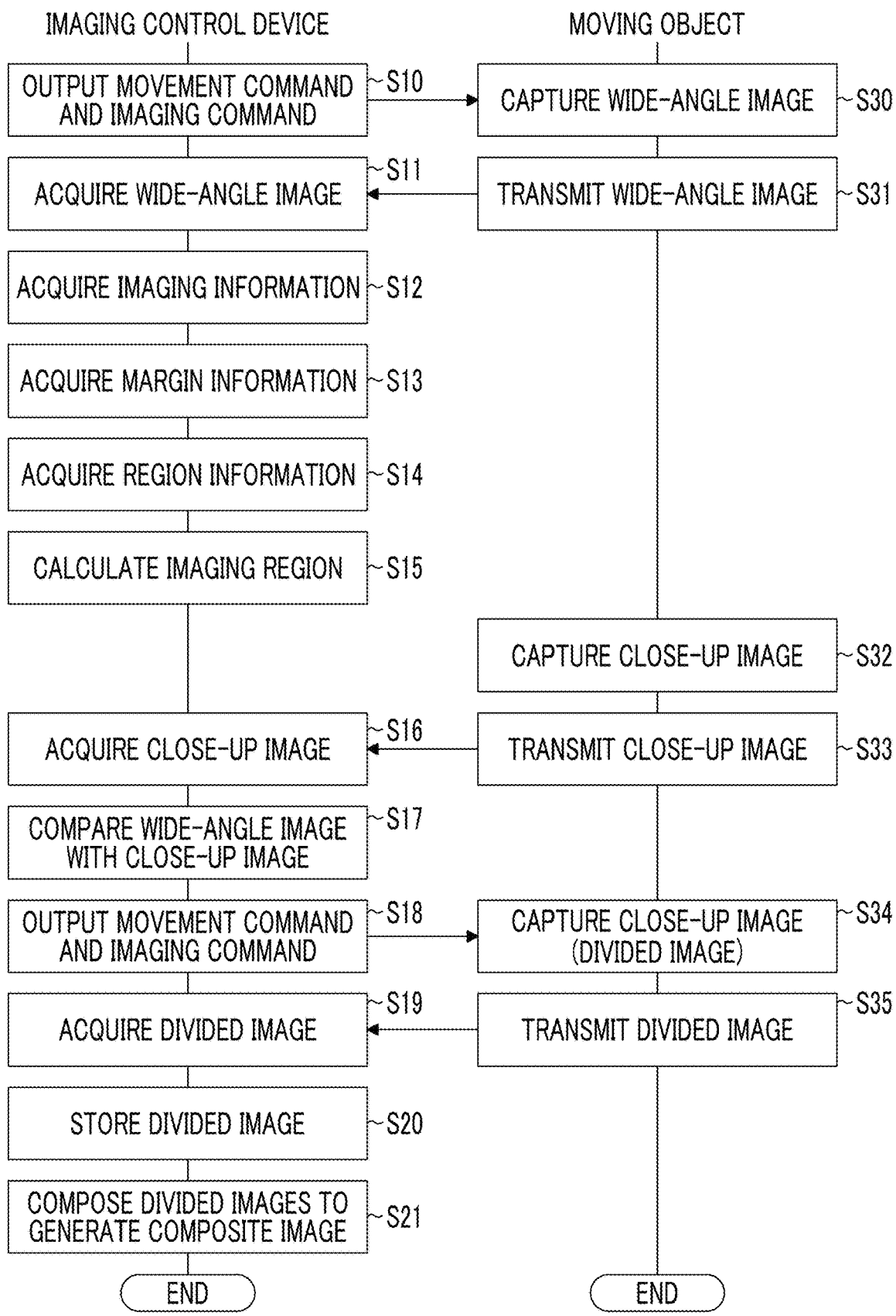
FIG. 9 is an operation flow diagram showing an operation of the imaging system.

FIG. 9 is an operation flow diagram showing the operation of the imaging system 500, and shows steps of an imaging control method.

Figure 10:
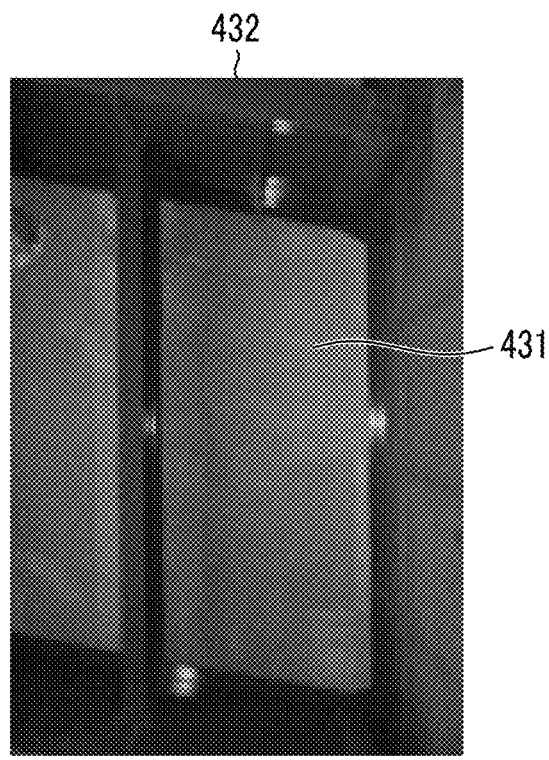
FIG. 10 is a diagram showing a wide-angle image.

First, the imaging control device outputs the movement command and the imaging command to the moving object 100 (Step S10). The moving object 100 that receives the movement command and the imaging command output from the imaging control device moves based on the movement command, and then, images the deck slab 6 of the panel as the imaging target (Step S30). For example, the moving object 100 acquires a wide-angle image 432, in which a whole image of a panel 431 is reflected, as shown in FIG. 10.

Next, the moving object 100 transmits the wide-angle image to the imaging control device (Step S31) and the imaging control device acquires the wide-angle image (Step S11: wide-angle image acquisition step).

The imaging control device acquires the imaging information input from a user through the input unit 328 with the imaging information acquisition unit 405 (Step S12: imaging information acquisition step), acquires the margin information input from the user through the input unit 328 with the margin information acquisition unit 407 (Step S13: margin information acquisition step), and acquires the region information input from the user through the input unit 328 with the region information acquisition unit 409 (Step S14: region information acquisition step).

Figure 11:
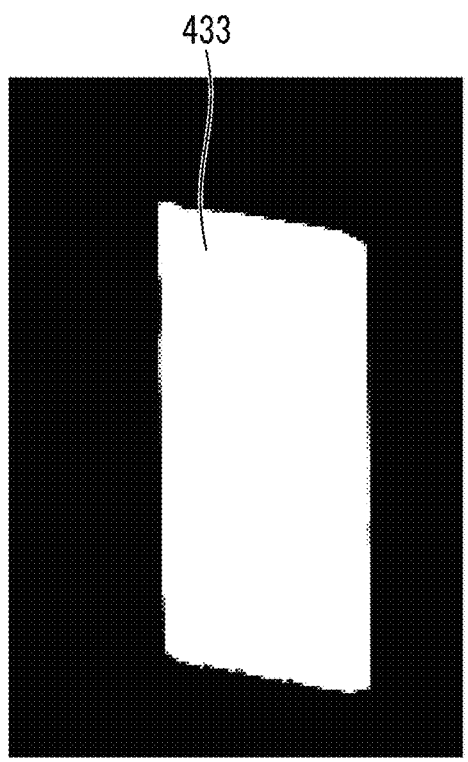
FIG. 11 is a diagram showing a concept of imaging target region information.

FIG. 11 is a diagram showing the concept of the imaging target region information. In the imaging target region information shown in FIG. 11, the panel 431 in the wide-angle image shown in FIG. 10 is shown as an imaging target region 433.

Next, the imaging region calculation unit 413 of the imaging control device calculates imaging regions based on the acquired information (Step S15: imaging region calculation step).

Figure 12:
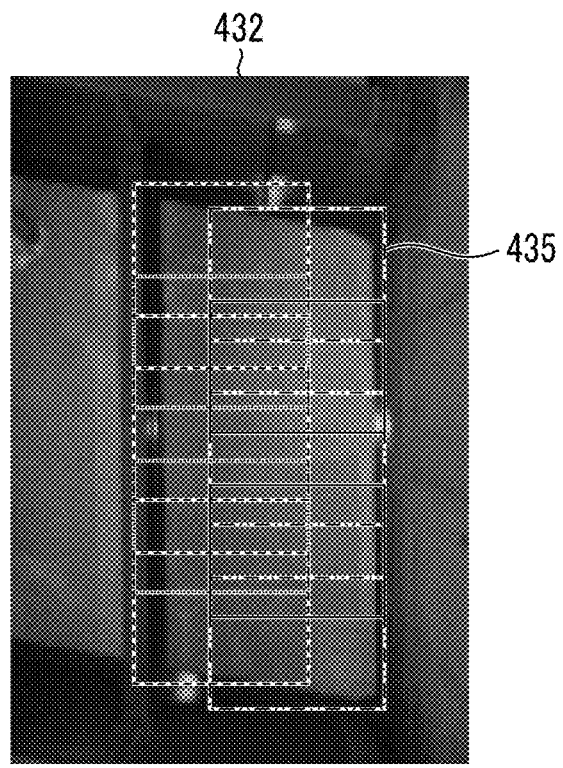
FIG. 12 is a diagram showing an imaging region.

FIG. 12 is a diagram showing the imaging regions calculated by the imaging region calculation unit 413. In FIG. 12, the imaging regions 435 calculated by the imaging region calculation unit 413 are superimposed on the wide-angle image 432, and the panel 431 is divided into 5×2=10 imaging regions 435 and imaged. As shown in FIG. 12, each calculated imaging region has a region (margin) where each divided image overlaps based on the acquired margin information.

The moving object 100 images the imaging target in the close-up imaging mode (Step S32), and moves while successively transmitting the images captured in the close-up imaging mode to the imaging control device (Step S33). Then, the imaging control device acquires the close-up images transmitted from the moving object 100 (Step S16), and makes the display unit 326 of the imaging control device display the close-up images.

Thereafter, the control unit 411 of the imaging control device compares the wide-angle image with the close-up image (Step S17), and moves the moving object 100 to make the moving object 100 perform imaging. Specifically, the control unit 411 compares the feature point of the close-up image acquired by the moving object 100 with the feature point of the imaging region of the wide-angle image to search for the correspondence points, and in a case where determination is made that the moving object 100 is at an imaging position where the close-up image corresponding to the imaging region can be acquired, outputs the imaging command to the moving object 100 (Step S18). The moving object 100 that receives the command acquires the close-up image of the imaging target (Step S34).

Figure 13:
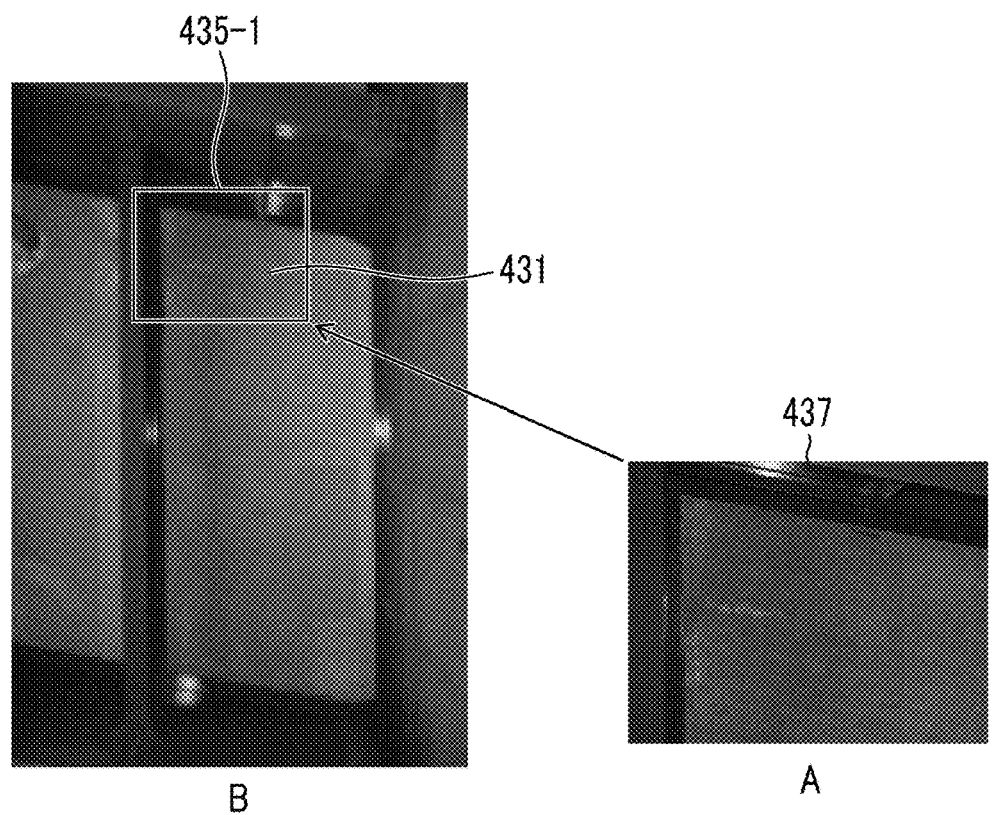
FIG. 13 is a diagram illustrating acquisition of a divided image.

FIG. 13 is a diagram illustrating acquisition of a divided image corresponding to an imaging region 435-1. An A portion of FIG. 13 shows a close-up image 437 acquired by the moving object 100, and a B portion of FIG. 13 shows the imaging region 435-1 in the wide-angle image. The control unit 411 acquires the close-up image 437, detects the correspondence points between the close-up image 437 and the imaging region 435-1 of the wide-angle image, and in a case where the correspondence points are detected and the moving object 100 can acquire the divided image corresponding to the imaging region 435-1, outputs the imaging command to the moving object 100.

The imaging control device and the moving object 100 repeats Steps S32, S33, S34, S35, S16, S17, S18, and S19 until the close-up images corresponding to all of the calculated imaging region are acquired. Steps S16, S17, S18, and S19 correspond to a control step.

Figure 14:
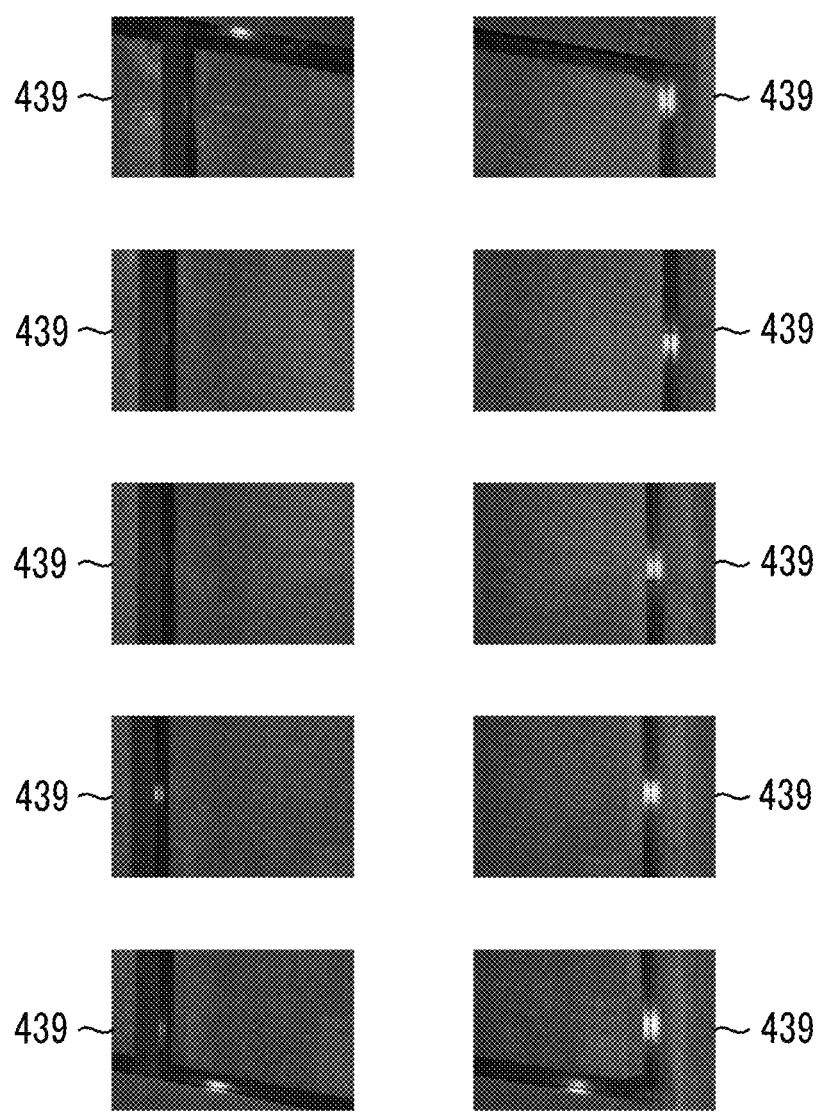
FIG. 14 is a diagram showing divided images.

FIG. 14 is a diagram showing divided images 439 for composing a composite image acquired by the moving object 100. In the case shown in FIG. 14, the divided images corresponding to the 5×2 imaging regions are acquired, and each divided image has a margin according to margin information. The control unit 411 of the imaging control device makes the storage unit 415 store the acquired divided image (Step S20).

Thereafter, the divided images are composed to generate the composite image (Step S21). The composition of the divided images is performed by, for example, the CPU 310 of the computer 300.

Figure 15:
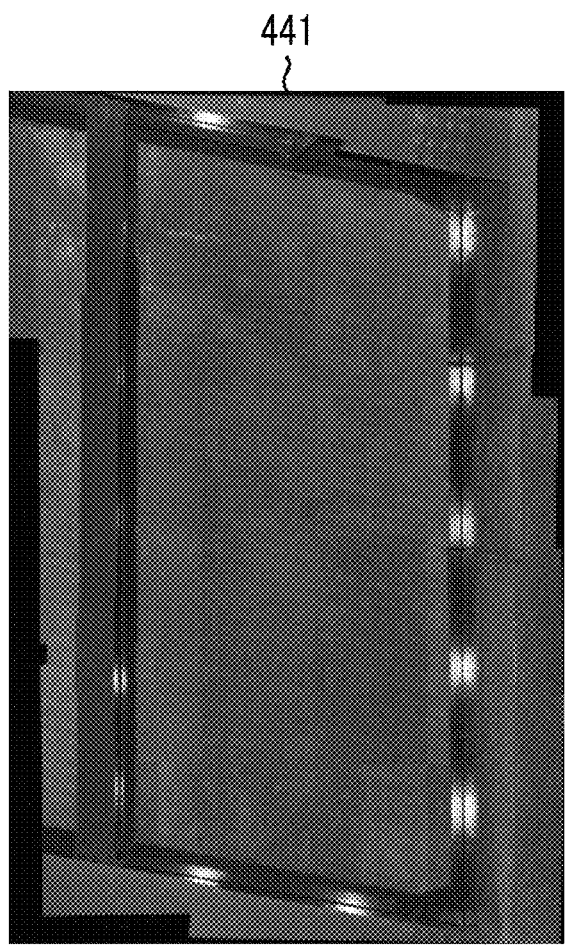
FIG. 15 is a diagram showing a composite image.

FIG. 15 is a diagram showing a composite image 441 that is generated by composing the divided images 439. Since the composite image 441 is constituted of the close-up images (divided images 439), the composite image 441 has image quality sufficient for detecting damage of the deck slab 6 through image processing.

In the above-described embodiment, the hardware structures of the processing units (for example, an image processing unit, a contour enhancement unit, a color correction unit, and a feature extraction unit) that execute various kinds of processing are various processors described below. Various processors include a central processing unit (CPU) that is a general-purpose processor executing software (program) to function as various processing units, a programmable logic device (PLD) that is a processor capable of changing a circuit configuration after manufacture, such as a field programmable gate array (FPGA), a dedicated electric circuit that is a processor having a circuit configuration dedicatedly designed for executing specific processing, such as an application specific integrated circuit (ASIC), and the like.

One processing unit may be configured of one of various processors described above or may be configured of a combination of two or more processors (for example, a plurality of FPGAs or a combination of a CPU and an FPGA) of the same type or different types. A plurality of processing units may be configured of one processor. As an example where a plurality of processing units are configured of one processor, first, as represented by a computer, such as a client or a server, there is a form in which one processor is configured of a combination of one or more CPUs and software, and the processor functions as a plurality of processing units. Secondly, as represented by system on chip (SoC) or the like, there is a form in which a processor that implements all functions of a system including a plurality of processing units into one integrated circuit (IC) chip is used. In this way, various processing units may be configured using one or more processors among various processors described above as a hardware structure.

In addition, the hardware structure of various processors is, more specifically, an electric circuit (circuitry) in which circuit elements, such as semiconductor elements, are combined.

The above-described configurations and functions can be appropriately implemented by any hardware, software, or combinations of hardware and software. For example, the invention can be applied to a program that causes a computer to execute the above-described processing steps (processing procedure), a computer-readable recording medium (non-transitory recording medium) having the program recorded thereon, or a computer on which the program can be installed.

Modification Example 1

Next, Modification Example 1 will be described.

Figure 16:
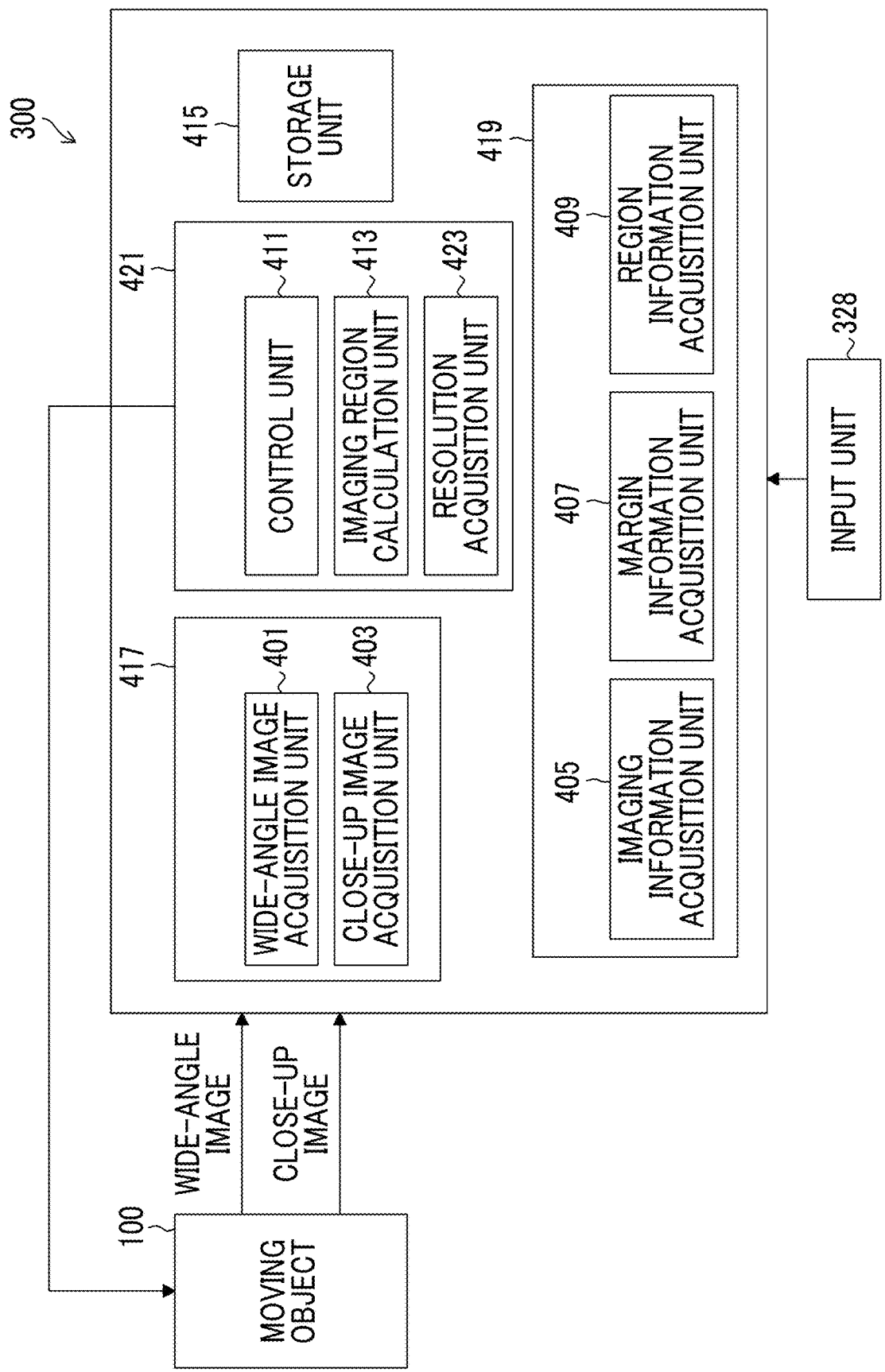
FIG. 16 is a diagram showing a functional configuration example of the imaging control device.

FIG. 16 is a diagram showing a functional configuration example of an imaging control device of Modification Example 1. The parts already described referring to FIG. 7 are represented by the same reference numerals, and description thereof will not be repeated.

The imaging control device of this example comprises a resolution acquisition unit 423 in the controller 421.

The resolution acquisition unit 423 acquires the resolution of the divided image, and the margin information acquisition unit 407 adjusts the margin information according to the resolution. Specifically, the margin information acquisition unit 407 adjusts the margin information so as to decrease the region of the margin in a case where the resolution of the divided image acquired by the resolution acquisition unit 423 is equal to or greater than a threshold value. The margin information acquisition unit 407 may adjust the margin information so as to increase the region of the margin in a case where the resolution of the divided image is less than the threshold value. The threshold value can be suitably decided by the user, and may be decided depending on the performance of the camera 101 or quality of inspection to be performed. The resolution is computed by, for example, dots per inch (dpi).

In a case where the margin information is adjusted in the margin information acquisition unit 407, the imaging region calculation unit 413 recalculates the imaging region based on the adjusted margin information.

Modification Example 2

Next, Modification Example 2 will be described.

FIG. 17 is a diagram showing a functional configuration example of an imaging control device of Modification Example 2. The parts already described referring to FIG. 7 are represented by the same reference numerals, and description thereof will not be repeated.

The imaging control device of this example comprises a feature point detection unit 425 in the controller 421.

The feature point detection unit 425 detects the feature points of a plurality of divided images in a case of composition, and the margin information acquisition unit 407 adjusts the margin information according to the number of feature points. Specifically, the margin information acquisition unit 407 adjusts the margin information so as to decrease the region of the margin in a case where the feature point detection unit 425 detects the number of feature points of the divided images equal to or greater than a threshold value. The margin information acquisition unit 407 may adjust the margin information so as to increase the region of the margin in a case where the feature point detection unit 425 detects the number of detected feature points of the divided images equal to or less than the threshold value. The threshold value can be suitably decided by the user, and may be decided depending on the performance of the camera 101 or quality of inspection to be performed.

In a case where the margin information is adjusted in the margin information acquisition unit 407, the imaging region calculation unit 413 recalculates the imaging region based on the adjusted margin information.

Although the example of the invention has been described above, the invention is not limited to the above-described embodiments, and may have various modifications without departing from the spirit of the invention.

EXPLANATION OF REFERENCES

1: bridge
2: main girder
cross beam
4: cross frame
5: lateral frame
6: deck slab
10: vehicle
100: moving object
101: camera
300: computer
301: housing
302: touch panel display
303: operation button
304: speaker
305: internal camera
306: external connection terminal
310: CPU
312: system bus
314: main memory
316: nonvolatile memory
318: mobile communication unit
318A: antenna
320: wireless LAN communication unit
320A: antenna
322: short range wireless communication unit
322A: antenna
324: wired communication unit
326: display unit
328: input unit
330: key input unit
332: sound processing unit
334: image processing unit
401: wide-angle image acquisition unit
403: close-up image acquisition unit
405: imaging information acquisition unit
407: margin information acquisition unit
409: region information acquisition unit
411: control unit
413: imaging region calculation unit
415: storage unit
417: image acquisition unit
419: parameter acquisition unit
421: controller
423: resolution acquisition unit
425: feature point detection unit
500: imaging system
S10-S21: imaging control step
S30-S35: control step of moving object

What is claimed is:

1. An imaging control device that controls imaging of a moving object comprising a camera, the imaging control device comprising:
   a processor configured to cause the device to:
   acquire a wide-angle image acquired by capturing a whole image of an imaging target in a wide-angle imaging mode;
   acquire imaging information relating to a number of images or an imaging angle of view of a plurality of divided images acquired by capturing a part of the whole image of the imaging target in an imaging mode with the camera of the moving object;
   acquire margin information relating to a margin in a case where the plurality of divided images are composed to generate a composite image of the imaging target;
   acquire imaging target region information relating to a region of the whole image of the imaging target;
   calculate an imaging region of each of the divided images constituting the composite image as each imaging region in the wide-angle image, in which the margin is secured, based on the imaging information, the margin information, and the imaging target region information;
   move the moving object, makes the moving object image each calculated imaging region in the imaging mode with the camera, and acquires captured images as the divided images,
   compare an image corresponding to each imaging region of the acquired wide-angle image with an image captured in the imaging mode with the camera, and
   estimate a position of the moving object based on the comparison of the acquired wide-angle image with the image captured in the imaging mode with the camera, and controls a position of the moving object based on the position estimated where the camera is made to image each imaging region in the imaging mode.

2. The imaging control device according to claim 1, wherein the processor is configured to cause the device to calculate the imaging region where the composite image is constituted of a minimum number of the divided images.

3. The imaging control device according to claim 1, wherein the processor is configured to acquire a margin ratio indicating a degree of overlap of adjacent divided images as the margin information.

4. The imaging control device according to claim 1, wherein the processor is configured to acquire resolution of the divided images, and
   adjust the margin information according to the resolution.

5. The imaging control device according to claim 1, wherein the processor is configured to detect feature points of the plurality of divided images in a case of the composition, and
   adjust the margin information according to a number of feature points.

6. The imaging control device according to claim 1, wherein the processor is configured to make the moving object acquire the images captured in the imaging mode as the divided images by detecting correspondence points between the images and images corresponding to the imaging regions.

7. The imaging control device according to claim 1, wherein the processor is configured to estimate the position of the moving object by detecting correspondence points between the image corresponding to each imaging region of the wide-angle image and the image captured in the imaging mode with the camera.

8. The imaging control device according to claim 1, further comprising
   a memory that stores the divided images,
   wherein the processor is configured to make the memory store the divided images.

9. The imaging control device according to claim 1, wherein the processor is configured to acquire drawing information of the imaging target as the imaging target region information.

10. An imaging system comprising:
    the imaging control device according to claim 1; and
    the moving object.

11. An imaging control method that controls imaging of a moving object comprising a camera, the imaging control method comprising:
    acquiring a wide-angle image acquired by capturing a whole image of an imaging target in a wide-angle imaging mode;
    acquiring imaging information relating to the number of images or an imaging angle of view of a plurality of divided images acquired by imaging a part of the whole image of the imaging target in an imaging mode with the camera of the moving object;
    acquiring margin information relating to a margin in a case where the plurality of divided images are composed to generate a composite image of the imaging target;
    acquiring imaging target region information relating to a region of the whole image of the imaging target;
    calculating an imaging region of each of the divided images constituting the composite image as each imaging region in the wide-angle image, in which the margin is secured, based on the imaging information, the margin information, and the imaging target region information; and
    moving the moving object, making the moving object image each calculated imaging region in the imaging mode with the camera, and acquiring captured images as the divided images;
    comparing an image corresponding to each imaging region of the acquired wide-angle image with an image captured in the imaging mode with the camera;
    estimating a position of the moving object based on the comparison of the acquired wide-angle image with an image captured in the imaging mode with the camera; and a position of the moving object based on the position estimated where the camera is made to image each imaging region in the imaging mode is controlled.

* * * * *